United States Patent
Chen

(10) Patent No.: US 7,577,721 B1
(45) Date of Patent: Aug. 18, 2009

(54) STRUCTURED PEER-TO-PEER PUSH DISTRIBUTION NETWORK

(75) Inventor: I-Ming Chen, Sindian (TW)

(73) Assignee: Trend Micro Incorporated, Tokyo (JP)

( * ) Notice: Subject to any disclaimer, the term of this patent is extended or adjusted under 35 U.S.C. 154(b) by 780 days.

(21) Appl. No.: 10/863,885

(22) Filed: Jun. 8, 2004

(51) Int. Cl.
C06F 15/16 (2006.01)

(52) U.S. Cl. ........................ 709/219; 709/222; 709/202; 709/227; 717/176; 717/177; 717/178

(58) Field of Classification Search ................. 709/219, 709/202, 222, 227; 717/176, 177, 178
See application file for complete search history.

(56) References Cited

U.S. PATENT DOCUMENTS

| | | | | |
|---|---|---|---|---|
| 5,001,628 A | * | 3/1991 | Johnson et al. | 707/10 |
| 5,131,041 A | * | 7/1992 | Brunner et al. | 370/219 |
| 5,394,526 A | * | 2/1995 | Crouse et al. | 709/219 |
| 5,452,442 A | * | 9/1995 | Kephart | 714/38 |
| 5,493,728 A | * | 2/1996 | Solton et al. | 711/113 |
| 5,623,600 A | * | 4/1997 | Ji et al. | 726/24 |
| 5,640,554 A | * | 6/1997 | Take | 707/7 |
| 5,713,017 A | * | 1/1998 | Lin et al. | 707/8 |
| 5,737,536 A | * | 4/1998 | Herrmann et al. | 709/229 |
| 5,790,886 A | * | 8/1998 | Allen | 710/5 |
| 5,822,529 A | * | 10/1998 | Kawai | 709/219 |
| 5,831,975 A | * | 11/1998 | Chen et al. | 370/256 |
| 5,862,346 A | * | 1/1999 | Kley et al. | 709/245 |
| 5,884,046 A | * | 3/1999 | Antonov | 709/238 |
| 5,892,914 A | * | 4/1999 | Pitts | 709/219 |
| 5,909,681 A | * | 6/1999 | Passera et al. | 707/8 |
| 5,920,697 A | * | 7/1999 | Masters et al. | 709/219 |
| 6,014,686 A | * | 1/2000 | Elnozahy et al. | 709/202 |
| 6,023,586 A | * | 2/2000 | Gaisford et al. | 717/178 |
| 6,108,703 A | * | 8/2000 | Leighton et al. | 709/226 |
| 6,119,165 A | * | 9/2000 | Li et al. | 709/229 |
| 6,125,365 A | * | 9/2000 | Nakatsugawa | 707/103 R |
| 6,128,647 A | * | 10/2000 | Haury | 709/207 |
| 6,311,206 B1 | * | 10/2001 | Malkin et al. | 709/202 |
| 6,311,265 B1 | * | 10/2001 | Beckerle et al. | 712/203 |

(Continued)

FOREIGN PATENT DOCUMENTS

CA    2317221 A1 *  3/2002

OTHER PUBLICATIONS

Sung and Xu, IP Traceback-Based Intelligent packet Filtering: A novel Technique for Defending Aainst Internet DDoS Attacks; Sep. 2003, IEEE vol. 14 No. 9 Article 1233709, Abstract.*

(Continued)

*Primary Examiner*—Ario Etienne
*Assistant Examiner*—Anthony Fabbri
(74) *Attorney, Agent, or Firm*—Okamoto & Benedicto LLP

(57) ABSTRACT

In one embodiment, a peer-to-peer computer network has a multilevel tree structure that includes a plurality of computers. Each computer belonging to the network is assigned to a level such that it can receive a message from an upstream computer and push the message to a downstream computer. The message, which may be a pattern file of an antivirus program, may be rapidly propagated to available computers belonging to the network by pushing the message from a pattern file server to computers on a top level of the network, from computers on the top level of the network to computers on a lower level, and so on.

11 Claims, 4 Drawing Sheets

U.S. PATENT DOCUMENTS

| | | | |
|---|---|---|---|
| 6,374,202 B1* | 4/2002 | Robinson | 703/13 |
| 6,505,241 B2* | 1/2003 | Pitts | 709/218 |
| 6,813,712 B1* | 11/2004 | Luke | 726/24 |
| 6,891,802 B1* | 5/2005 | Hubbard | 370/241 |
| 6,966,059 B1* | 11/2005 | Shetty et al. | 717/172 |
| 6,986,050 B2* | 1/2006 | Hypponen | 713/183 |
| 7,076,553 B2* | 7/2006 | Chan et al. | 709/226 |
| 2003/0066065 A1* | 4/2003 | Larkin | 717/177 |
| 2004/0005873 A1* | 1/2004 | Groenendaal et al. | 455/410 |
| 2005/0064859 A1* | 3/2005 | Kotzin et al. | 455/419 |
| 2005/0273841 A1* | 12/2005 | Freund | 726/1 |
| 2005/0273853 A1* | 12/2005 | Oba et al. | 726/22 |

OTHER PUBLICATIONS

Mitzenmacher, The Power of Two Choices in Randomized Load Balancing, 1991, University of California at Berkeley, Doctoral Thesis, pp. 17-21.*

John Jannotti, Network Services in an Uncooperative Internet, Defeating DDoS arstechnica.com/reviews/2q00/networking/networking-4.html#ddos.*

MSBlast,exe Worm Virus Removal Instructions, Aug. 15, 2003, PC Hell.com.*

Demers et al.; Epidemic Algorithms for Replicated Database Maintenance; Aug. 4, 1987; Xerox Palo Alto Research Center; Association for Computing Machinery (ACM); pp. 8-32.*

Messmer; Experts predict more mutating viruses; Oct. 30, 2000; Network World; pp. 1, 104.*

Unknown Author; Joltid PeerEnabler Distribution Proves Effectiveness During MSBlast Virus Scare; Aug. 21, 2003; PR Newswire; 2 Pages.*

Nokia—Connecting People, Webpage [online]. [Retrieved on Jan. 10, 2006]. Retrieved from the Internet: <URL://http:press.nokia.com/PR/200409/959974_5.html>.

"Bluetooth—An Overview, Establising network connections", [online]. Johnson Consulting 2001. [Retrieved on Jan. 10, 2006]. Retrieved from the Internet <URL://http:www.swedetrack.com/images/bluet14.htm>.

PCTechGuide—netcalibur. [online] [Retrieved on Jan. 6, 2006]. Retrieved from the Internet<URL:http://www.pctechguide.com/30mobcomms_Bluetooth.htm>.

Bluetooth—An Overview, How networks are formed and formed and controlled. [online]. Johnson Consulting 2001. [Retrieved on Jan. 6, 2006]. Retrieved from the Internet <URL:http://www.swedetrack.com/image/bluet10.htm>.

* cited by examiner

STRUCTURED PEER-TO-PEER PUSH DISTRIBUTION NETWORK

BACKGROUND OF THE INVENTION

1. Field of the Invention

The present invention relates generally to computer systems, and more particularly but not exclusively to content filtering systems.

2. Description of the Background Art

Content filtering systems are employed in computer systems to scan incoming data for malicious content, such as computer viruses, spam, unwanted content, and unauthorized network intrusion. A content filtering system typically includes a pattern file against which data units (e.g., files, packets) are compared. An antivirus program is an example content filtering system that employs a pattern file. The pattern file of an antivirus program contains the patterns or signatures of known computer viruses. An antivirus program compares the contents of an incoming data unit against the contents of a pattern file to determine if the data unit has a virus. A pattern file is periodically updated to include the patterns of newly discovered viruses.

In the event of a computer virus outbreak, antivirus researchers race to develop an antidote for the virus. The antidote is typically in the form of a pattern file that is distributed to computers signed up to receive pattern file updates. Large public networks, such as the Internet, allow a computer virus to rapidly spread throughout the world. This makes it imperative to distribute antidotes before large number of computers have been infected or otherwise damaged by the virus.

SUMMARY

In one embodiment, a peer-to-peer computer network has a multilevel tree structure that includes a plurality of computers. Each computer belonging to the network is assigned to a level such that it can receive a message from an upstream computer and push the message to a downstream computer. The message, which may be a pattern file of an antivirus program, may be rapidly propagated to available computers belonging to the network by pushing the message from a pattern file server to computers on a top level of the network, from computers on the top level of the network to computers on a lower level, and so on.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that the components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may then be executed by a processor. Components may be implemented separately in multiple modules or together in a single module.

Figure 1:
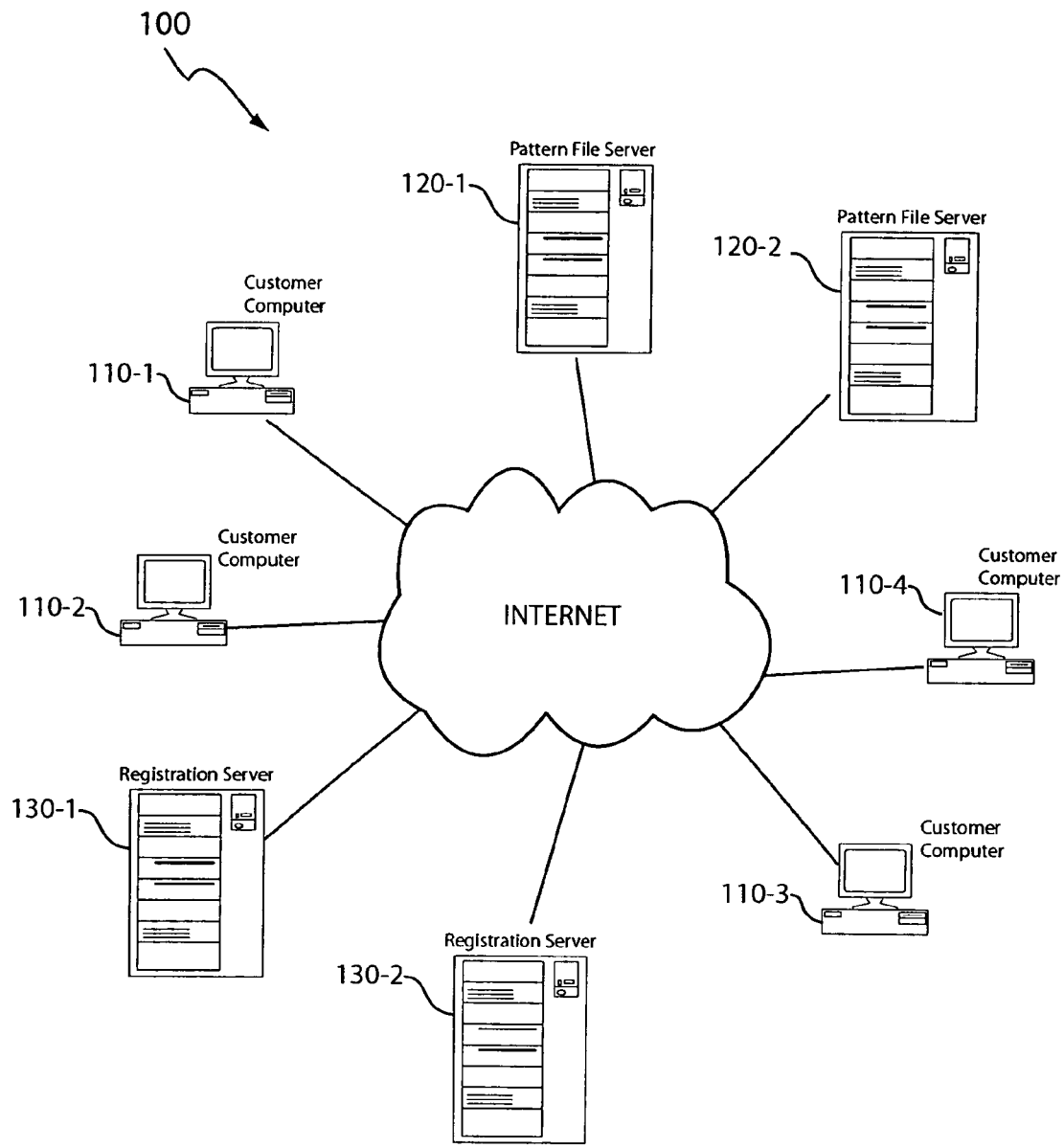
FIG. 1 shows a computer network in accordance with an embodiment of the present invention.

FIG. 1 shows a computing environment 100 in accordance with an embodiment of the present invention. Computing environment 100 may include one or more customer computers 110 (i.e., 110-1, 110-2, . . . ), one or more pattern file servers 120 (i.e., 120-1, 120-2, . . . ), and one or more registration servers 130 (i.e., 130-1, 130-2, . . . ). Other network components, such as gateways, routers, and other computers are not shown for clarity of illustration. In one embodiment, customer computers 110, pattern file servers 120, and registration servers 130 communicate over the Internet.

A customer computer 110 may be a desktop, server, gateway, router, or other type of computer employing a content filtering system that is signed up to receive updated pattern files. In one embodiment, a customer computer 110 employs an antivirus program from a vendor that operates and maintains pattern file servers 120. The vendor employs researchers who develop antidotes for computer viruses. The antidotes may be in the form of an updated pattern file that contains information on how to identify and deal with the virus (e.g., how to remove the virus from infected systems). As will be more apparent below, updated pattern files may be stored in pattern file servers 120 and distributed to customer computers using peer-to-peer push technology.

A pattern file server 120 may comprise a server computer for storing the latest pattern files for content filtering systems resident in customer computers 110. For example, a pattern file server 120 may store updated pattern files for antivirus programs in customer computers 110.

A registration server 130 may comprise a server computer where customer computers 110 may register to log into a peer-to-peer network. In one embodiment, the peer-to-peer network has a multi-level tree structure (see FIG. 3). The tree structure allows for relatively fast distribution of pattern files from pattern file servers 120 to customer computers 110 in the different levels of the tree structure.

Figure 2:
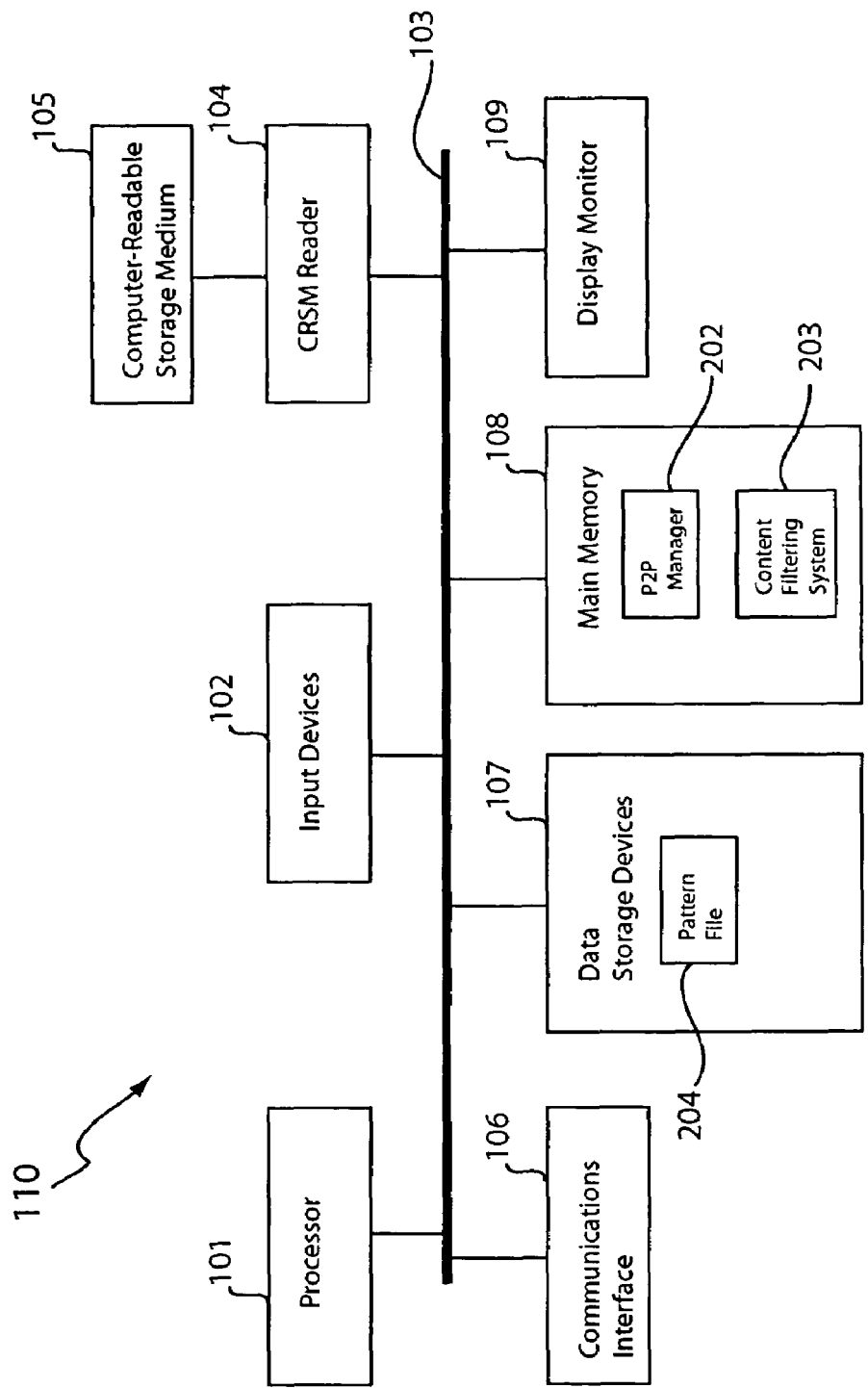
FIG. 2 a schematically shows a customer computer in accordance with an embodiment of the present invention.

Referring now to FIG. 2, there is shown a customer computer 110 in accordance with embodiments of the present invention. The computer 110 may have less or more components to meet the needs of a particular application. As shown in FIG. 2, the computer 110 may include a processor 101, such as those from the Intel Corporation or Advanced Micro Devices, for example. The computer 110 may have one or more buses 103 coupling its various components. The computer 110 may include one or more input devices 102 (e.g., keyboard, mouse), a computer-readable storage medium (CRSM) 105 (e.g., floppy disk, CD-ROM), a CRSM reader 104 (e.g., floppy drive, CD-ROM drive), a display monitor 109 (e.g., cathode ray tube, flat panel display), a communications interface 106 (e.g., network adapter, modem) for coupling to a network, one or more data storage devices 107 (e.g., hard disk drive, optical drive, FLASH memory), and a main memory 108 (e.g., RAM). Software embodiments may be stored in a computer-readable storage medium 105 for reading into a data storage device 107 or main memory 108.

In the example of FIG. 2, main memory 108 may be configured to include a peer-to-peer manager 202 and a content filtering system 203. The peer-to-peer manager 202 may comprise computer-readable program code for registering with a registration server 130 to join a peer-to-peer network and for communicating with another customer computer 110 belonging to the peer-to-peer network. The peer-to-peer manager 202 facilitates data transfer between the customer computer 110 and another customer computer 110 using peer-to-peer protocol. For example, the peer-to-peer manager 202 allows the customer computer 110 to receive a pattern file from an upstream customer computer 110 and to push the pattern file to a downstream customer computer 110. Each customer computer 110 may keep a copy of the pattern file in this peer-to-peer push distribution scheme. The transfer of the pattern file is referred to as "push" (as opposed to pull) because the receiving customer computer receives the pattern file without having to ask for it. The peer-to-peer manager 202 may employ available secure communication and authentication mechanisms to ensure it is receiving and pushing the pattern file from and to authorized customer computers 110. For example, the peer-to-peer manager 202 may be configured to receive a token from a registration server 130 during a registration process, and exchange tokens with other customer computers 110 for authentication purposes.

Main memory 108 may also be configured to include a content filtering system 203. In one embodiment, content filtering system 203 comprises an antivirus program that employs a pattern file 204 stored in the data storage 107. The pattern file 204 may be updated with the latest pattern file over the Internet by way of communications interface 106.

Figure 3:
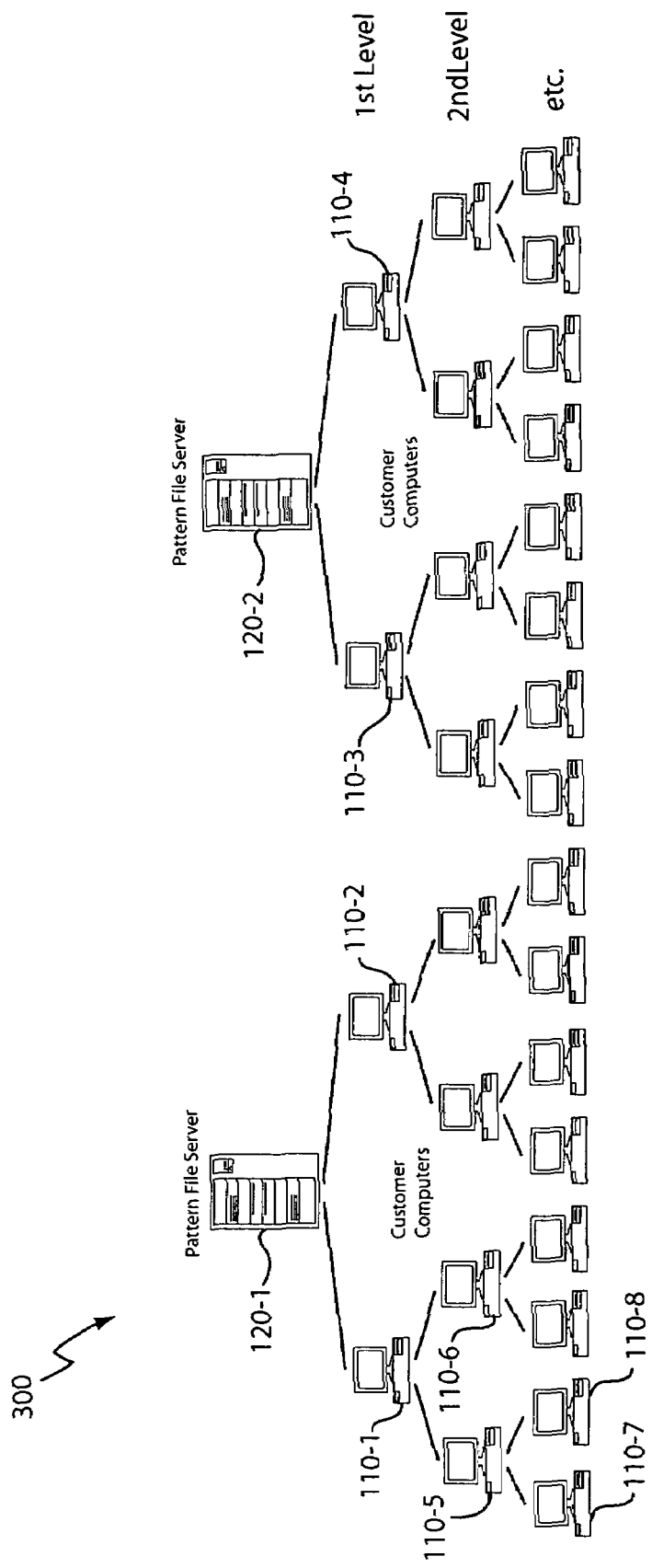
FIG. 3 schematically shows a peer-to-peer network in accordance with an embodiment of the present invention.

FIG. 3 schematically shows a peer-to-peer network 300 in accordance with an embodiment of the present invention. Network 300 has a tree structure in that it is shaped like an upside down tree. In one embodiment, network 300 organizes customer computers 110 into different levels, with customer computers 110 closest to a pattern file server 120 being on a first (i.e. top) level, customer computers 110 just below the first level being on a second level, and so on. Customer computers 110 on higher levels are also referred to as being "upstream," while customer computers 110 on lower levels are referred to as being "downstream." For example, customer computer 110-1 is upstream of customer computer 110-5, while customer computer 110-8 is downstream of customer computer 110-5. In the example of FIG. 3, customer computers 110-1, 110-2, 110-3, and 110-4 are on the first level of network 300, customer computers 110-5 and 110-6 are on the second level of network 300, and so on. Only a few customer computers 110 are labeled in FIG. 3 for clarity of illustration. Also, the number of levels, pattern file servers 120, and customer computers 110 within each level of network 300 may be varied depending on the application.

In one embodiment, a pattern file to be distributed to customer computers 110 belonging to peer-to-peer network 300 is pushed from a pattern file server 120 to customer computers 110 on the first level. That is, unlike peer-to-peer pull technology, the pattern file is provided by the pattern file server 120 to customer computers 110 on the first level without the customer computers 110 asking for the pattern file. This advantageously allows for distribution of the pattern file as soon as it is available, and without customer computers 110 having to ask for it. Pattern files in customer computers 110 may thus be updated even when customers are not aware their pattern files need updating. Similarly, customer computers 110 on the first level push the pattern file to customer computers 110 on the second level. The pattern file may be pushed from upstream to downstream customer computers 110 until the pattern file is propagated to all available customer computers 110.

Conventional peer-to-peer networks not only use pull technology to receive data (i.e., computers have to affirmatively request for data), but also have a loosely organized structure. Conventional peer-to-peer networks cannot be relied upon to efficiently and quickly distribute data as that is not a concern of typical peer-to-peer networks. This makes conventional peer-to-peer networks unsuitable for fast distribution of time-critical data, such as pattern files of antivirus programs, for example. In contrast to conventional peer-to-peer networks, network 300 is structured such that customer computers 110 are assigned to a level that would allow for relatively fast distribution of pattern files.

In one embodiment, each customer computer 110 registering to join peer-to-peer network 300 is randomly assigned by a registration server 130 (see FIG. 1) to one of several levels of the network such that the number of customer computers 110 on each level grows exponentially, the lower levels having more room for customer computers 110 than higher levels (e.g., more customer computers assigned to be on the 6th level than on the 2nd level). Doing so helps achieve the goal of delivering a pattern file in roughly $\log_k N$ steps, where "N" is the total number of customer computers in the network and "k" is the number of downstream customer computers a customer computer can have. For example, a registration server 130 may assign a customer computer 110 to a level "L" with a probability of $$P_L = \frac{e^L - 1}{\sum_{n=1}^{W} e^n - 1} \left(\text{Note that } \sum_{L=1}^{W} P_L = 1\right)$$

with "W" being the number levels in peer-to-peer network 300. Within each level, a customer computer 110 may be randomly assigned a number of downstream customer computers 110 of a lower level to push a pattern file to. Using FIG. 3 as an example, customer computer 110-5 may be assigned to push a pattern file to downstream customer computers 110-7 and 110-8. As can be appreciated, "fudge factors" may be used in assigning customer computers 110. For example, data link speeds and the geographic location of customer computers 110, pattern file servers 120, and Internet service providers (ISP) may be taken into account in assigning customer computers 110 in network 300. Preferably, customer computers 110 are assigned to receive pattern files from upstream customer computers 110 within the same geographic region and Class B subnet.

Figure 4:
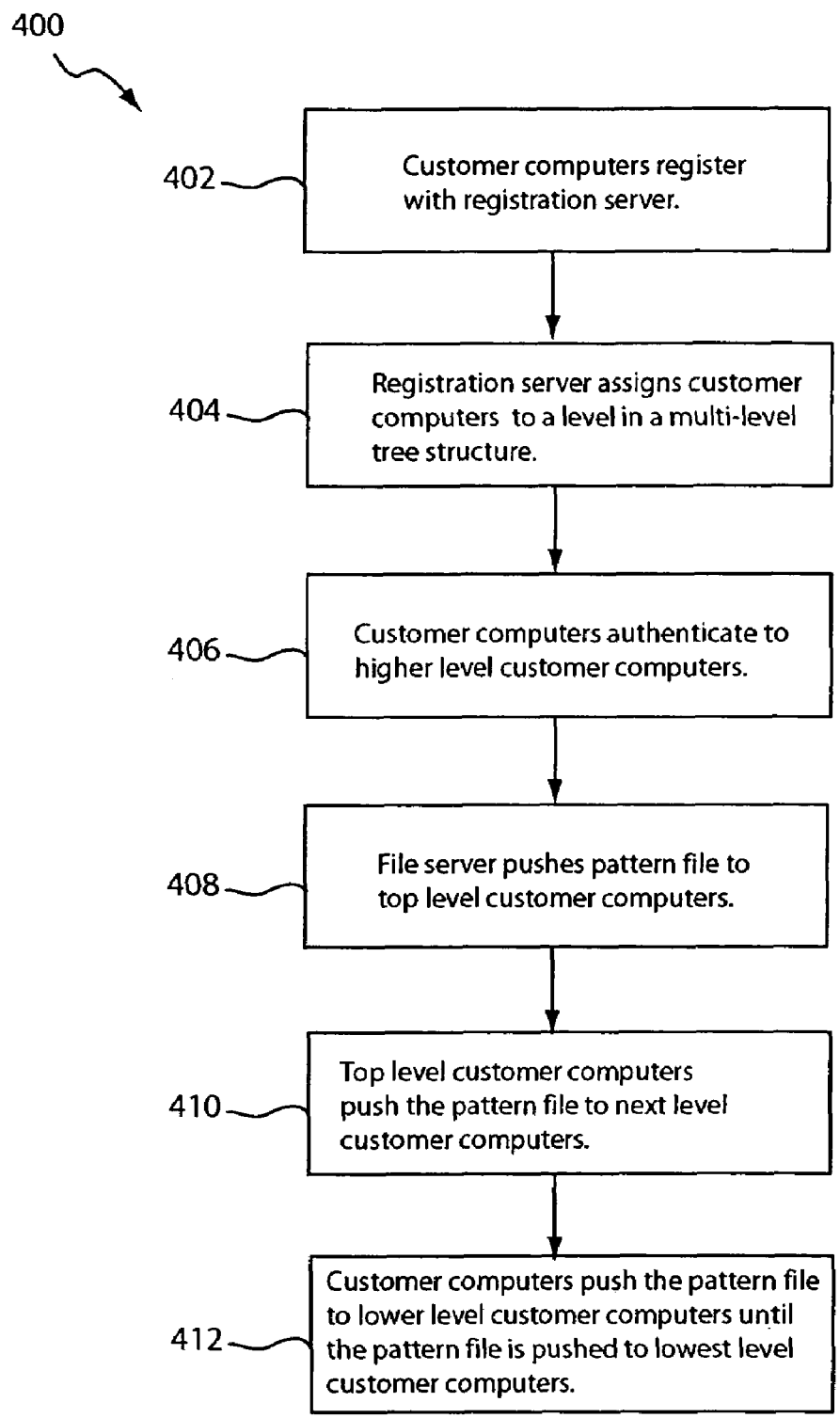
FIG. 4 shows a flow diagram of a method of distributing pattern files in a peer-to-peer network in accordance with an embodiment of the present invention.

FIG. 4 shows a flow diagram of a method 400 of distributing pattern files in a peer-to-peer network in accordance with an embodiment of the present invention. Method 400 may be, but not necessarily, performed by the computers shown in FIG. 1. Beginning in step 402, customer computers register with a registration server to log onto the peer-to-peer network.

In step 404, the registration server assigns each customer computer to a level in a multi-level tree structure (e.g., see FIG. 3) of the peer-to-peer network. The multi-level tree structure may have a first level closest to a pattern file server, a second level below the first level, and lower levels further down the tree structure. In one embodiment, the registration server assigns each customer computer such that the number of customer computers on each level grows exponentially, with lower levels having more room for customer computers than higher levels. Each customer computer may be assigned to receive a pattern file from an upstream, higher level customer computer. The registration server may inform registering customer computers the upstream customer computers they are supposed to receive pattern files from, and the downstream customer computers they are supposed to push files to. The registration server may provide tokens to registering customer computers for authentication purposes.

In step 406, the customer computers authenticate to their respective upstream customer computers. Using FIG. 3 as an example, assuming customer computer 110-8 has been assigned by a registration server 130 to receive pattern files from customer computer 110-5, customer computer 110-8 may contact and exchange tokens with customer computer 110-5. Customer computer 110-5 may validate the token from customer computer 110-8 and add customer computer 110-8 to its list of computers to push pattern files to. Likewise, customer computer 110-8 may validate the token from customer computer 110-5 and add customer computer 110-5 to its list of computers to receive pattern files from.

In step 408, a pattern file server pushes a pattern file to customer computers on the top level of the peer-to-peer network. The pattern file may be the latest pattern file for antivirus programs resident in customer computers belonging to the peer-to-peer network, for example.

In step 410, the customer computers on the top level push the pattern file to their assigned downstream customer computers on the next, lower level.

In step 412, the pattern file is pushed to customer computers until the pattern file propagates to customer computers on the lowest level of the peer-to-peer network.

As can be appreciated from the foregoing, embodiments of the present invention allow for relatively fast distribution of messages in a computer network. Embodiments of the present invention are thus especially useful in distributing time-critical messages, such as pattern files of antivirus programs. By using customer computers to distribute pattern files, customers effectively partner with content filtering vendors in the fight against malicious programs.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A peer-to-peer computer network comprising:
   a pattern file server storing a latest pattern file for an antivirus program;
   a plurality of customer computers, each of the plurality of customer computers including the antivirus program and an old pattern file for the antivirus program, the old pattern file to be replaced by the latest pattern file;
   a registration server configured to randomly, according to an algorithm, assign each customer computer in the plurality of customer computers to a level in a multi-level peer-to-peer network having a tree structure, each level in the peer-to-peer network having fewer customer computers than a lower level;
   wherein each customer computer in the plurality of customer computers is configured to push the latest pattern file to another customer computer in a lower level of the peer-to-peer network; and
   to continue pushing the latest pattern file to computers on lower levels of the peer-to-peer network until the latest pattern file is received in computers on a lowest level of the peer-to-peer network.

2. The network of claim 1 wherein the pattern file server is configured to push the latest pattern file to a customer computer on a top level of the peer-to-peer network.

3. The network of claim 1 wherein the registration server assigns each customer computer in the plurality of customer computers such that a number of customer computers in each level of the peer-to-peer network grows at an exponential rate.

4. The network of claim 1 wherein the peer-to-peer network is over the Internet.

5. A method of propagating a message in a computer network, the method comprising:
   receiving a request from a first computer to log onto a peer-to-peer network, the peer-to-peer network having multiple levels;
   randomly assigning the first computer to a level of the peer-to-peer network, the first computer being assigned to receive a message from a second computer, the second computer being on a higher level than the first computer in the peer-to-peer network;
   authenticating a connection between the first and second computers;
   pushing a message from the second computer to the first computer; and
   wherein the first computer is assigned to a level "L" of the peer-to-peer network according to a probability $$P_L = \frac{e^L - 1}{\sum_{n=1}^{W} (e^n - 1)}$$

where $$\sum_{L=1}^{W} P_L = 1$$

and "W" is a number of levels in the peer-to-peer network.

6. The method of claim 5 wherein the first computer is assigned to a level of the peer-to-peer network such that a number of computers assigned to each level of the peer-to-peer network grows at an exponential rate.

7. The method of claim 5 wherein the message comprises a pattern file of an antivirus program.

8. The method of claim 5 wherein the peer-to-peer network is over the Internet.

9. The method of claim 5 wherein the peer-to-peer network has a tree structure.

10. The method of claim 5 further comprising:
    pushing the message from a pattern file server to the second computer prior to the second computer pushing the message to the first computer.

11. The method of claim 5 further comprising:
    continue pushing the message to computers on lower levels of the peer-to-peer network until the message is received in computers on the lowest level of the peer-to-peer network.

* * * * *